June 16, 1931.    G. SUNDBACK    1,810,686
SEPARABLE FASTENER
Original Filed Sept. 22, 1926
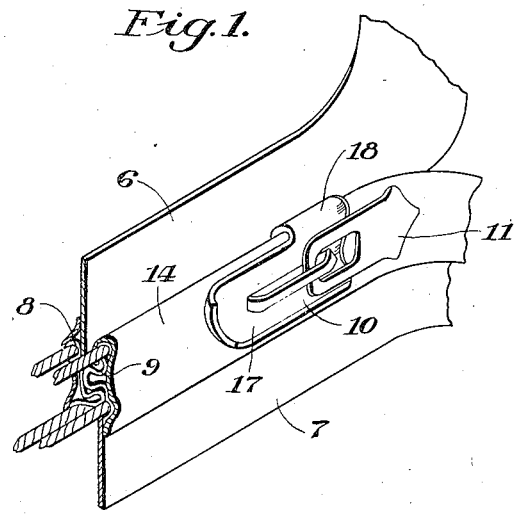
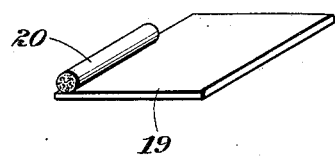
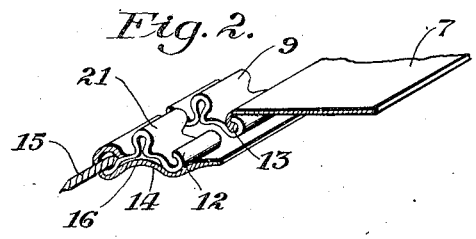
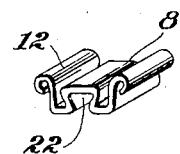
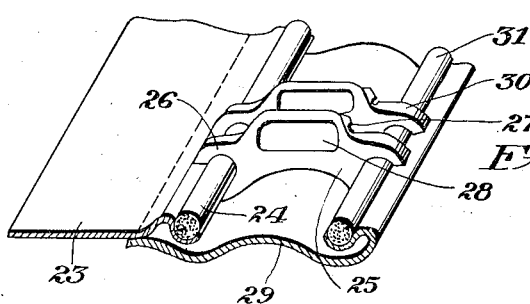
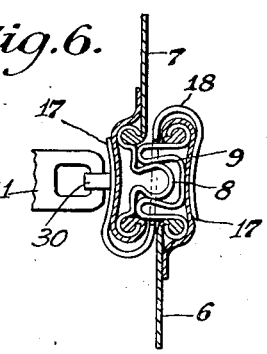
INVENTOR.
Gideon Sundback.
BY  R. S. Kelley.
ATTORNEY.

Patented June 16, 1931

1,810,686

UNITED STATES PATENT OFFICE

GIDEON SUNDBACK, OF MEADVILLE, PENNSYLVANIA, ASSIGNOR TO HOOKLESS FASTENER COMPANY, OF MEADVILLE, PENNSYLVANIA, A CORPORATION OF PENNSYLVANIA

SEPARABLE FASTENER

Original application filed September 22, 1926, Serial No. 137,018, and in Great Britain September 22, 1927. Divided and this application filed February 5, 1930. Serial No. 426,014.

My invention relates to separable interlocking fasteners and has for its main object to provide a novel, and in some respects, improved means for attaching the fastener elements to the flexible stringers.

This is a division of my Patent No. 1,746,565, February 11, 1930.

A further object is to provide improved flexible covering means for the fastener elements to form a smooth continuous track for the slider and to hide the fastener elements from view.

A more specific object is to provide a beaded edge on a flexible fastener stringer for holding the fastener elements which consists of a single enlargement or cord disposed wholly on one side of the strip.

Other objects and advantages of the invention will more fully appear during the following specification.

In the accompanying drawings, I have shown for purposes of illustration, two embodiments which my invention may assume in practice. In these drawings:

Fig. 1 is a perspective view of a fastener embodying my invention.

Fig. 2 is a fragmentary view showing the manner of attachment of the fastener elements to the flexible stringer.

Fig. 3 is a detail perspective view of one of the fastener elements.

Fig. 4 is a fragmentary view illustrating the single corded edge stringer of my invention.

Fig. 5 is a perspective view with parts in section, of a modified fastener stringer embodying my invention.

Fig. 6 is a cross-sectional view through the fastener and slider of Fig. 1.

The fastening device illustrated in Fig. 1 as is usual in the art, comprises a pair of flexible stringers or tapes 6 and 7 having attached thereto along their adjacent longitudinal edges, fastener elements 8 and 9 respectively. A slider 10 is actuated by a pull member 11 along the fastener elements to open and close them progressively as more fully illustrated and described in my patent above referred to.

As best illustrated in Figs. 2 and 3, each of the fastener elements has an attaching or clamping portion 12 which is bent around the beaded or corded edge 13 of the flexible stringer so as securely to hold the fastener element on its stringer. In this particular type of fastener, a flexible covering strip 14 is attached to each stringer adjacent the fastener elements which extends over the fastener elements and has a corded edge 15 at its other end which may be connected to the outer ends of the fastener elements. The fastener elements and the flexible covering strips are so formed as to provide shallow curved grooves 16 constituting a slider trackway on opposite sides of the stringer to receive and guide the correspondingly curved wing portions 17 of the slider which are connected by an integral portion 18 not fully shown in Fig. 1 but indicated in dotted lines in Fig. 6. It will be understood that the two wings of the slider are of like construction except that one wing has a lug 30 for connection with the pull 11. The connecting portion 18 joins one side of one wing with the opposite side of the other wing and passes between the separated stringers during movement of the slider.

The slider in moving along the stringers, thus guides the fastener elements together and forces them into interlocking relation when moving in one direction and when moving in the opposite direction, the connecting portion 18 serves to separate the fastener elements as and more fully described in my Patent No. 1,746,565.

The construction of the flexible stringer is shown in more detail in Fig. 4. Such a stringer preferably comprises a thin fabric tape 19 which may be sewed or otherwise connected to the article to be fastened and a single cord 20 or other type of enlargement disposed wholly on one side of the tape and along one of its longitudinal edges. The cord is preferably secured to the fabric tape by stitching and is not inclosed by the material of the tape as is common in the art. In my Patent No. 1,243,458, dated October 16, 1917, I have disclosed and claimed a flexible stringer having a cord disposed on each side and sewed to the fabric instead of being inclosed by the fabric. The advantages of the sewed-on cords are explained in this patent and have been well demonstrated by several years of commercial use. By the present invention many of the advantages of the double sewed corded edge are obtained by a single corded edge with the cord sewed on and at the same time, the construction is made simpler with accompanying advantages from the standpoint of production which will be readily apparent.

In Figs. 1 to 3 inclusive, the fastener elements 9 on the stringer 7 each comprises an interlocking projection 21 adapted to be received and held in a cooperating longitudinal recess 22 in one of the cooperating fastener elements 8. These elements are preferably made from sheet metal and possess enough resiliency to allow them to be snapped together.

In Fig. 5 there is illustrated a somewhat modified construction of the fastener elements. The fabric tape 23 has a cord 24 sewed along one edge and a series of fastener elements 25 have clamping portions 26 in the form of spaced jaws which embrace and clamp the corded edge. These clamping jaws are similar to the ones now employed in commercial fasteners. In the fastener elements here shown each has a central interlocking portion comprising a projection 27 and a recess 28 on opposite sides of the fastener element. These projections and recesses are adapted to interlock with corresponding projections and recesses on fastener elements of the cooperating stringer, the interlocking being accomplished on the same principle as in my Patent No. 1,219,881, March 20, 1917. As in the other embodiment, the fastener shown in Fig. 5 has a flexible covering strip 29 attached to the stringer 23 and connected to the outer ends of the fastener elements by the clamping portions 30 engaging the corded edge 31 which may be similar in construction to corded edge 24.

As a result of my invention it will be observed that a novel attaching means in the form of a single corded edge has been devised for securing the fastener elements to their stringers which has certain apparent advantages over the prior art constructions at least in some types of fasteners.

While I have in this application specifically described two embodiments which my invention may assume in practice, it will be understood that these embodiments are merely for the purposes of illustration and description and that various other forms may be devised within the scope of my invention as defined in the appended claims.

What I claim as my invention is:

1. In a fastening device, a pair of flexible strips of material each having a beaded edge, said beaded edge comprising an enlargement disposed wholly on one side of and along the edge of each strip, and a series of fastener elements carried by each strip, each of said elements having an attaching portion engaging said enlargement.

2. In a fastening device, a pair of flexible members having edges to be fastened, a separate flexible member along the edge of each member and on only one side thereof, and a series of fastener elements attached to each of said edges and having clamping portions engaging around said second flexible member.

3. In a fastening device, a pair of fastener stringers each comprising a flexible strip having a beaded edge, said beaded edge consisting of a single cord disposed wholly on one side of said strip, and a series of fastener elements on each stringer having attaching portions engaging around said single corded edge.

4. In a fastening device, a pair of fastener stringers each comprising a fabric tape having a beaded edge, said beaded edge consisting of a single cord disposed wholly on one side of said tape and secured thereto by stitching, and a series of fastener elements on each stringer having attaching portions engaging said beaded edge.

5. In a fastening device, a pair of fastener stringers each having a beaded edge consisting of a single cord disposed wholly on one side of said stringer, and a series of spaced fastener elements on each stringer, each of such elements having clamping jaws on opposite sides of said beaded edge for securing the elements to their stringer.

6. In a slide fastener, a pair of stringers each comprising a flexible fabric tape having a beaded edge consisting of a single cord sewed on one side of said strip, and a series of fastener elements on each stringer having attaching portions clamped to said beaded edge and portions forming a slider trackway, and a slider movable along said slider trackway for interlocking and releasing said fastener elements.

7. In a slide fastener, a pair of flexible stringers for attachment to an article to be fastened, a series of metal fastener elements attached to a longitudinal edge of each stringer and projecting outwardly therefrom, flexible covering strips attached to said stringers and extending over said fastener elements to provide a smooth continuous track for a slider and to hide the fastener elements from view when the fastener is closed, and a slider embracing said elements and covering strips to control engagement of said elements.

In testimony whereof I affix my signature.
GIDEON SUNDBACK.